United States Patent
Sarkisian et al.

(10) Patent No.: US 9,446,604 B2
(45) Date of Patent: Sep. 20, 2016

(54) WHITE PRE-TREATMENT COMPOSITION

(75) Inventors: George Sarkisian, San Diego, CA (US); Vladek Kasperchik, Corvallis, OR (US); Gregg A. Lane, San Diego, CA (US); Steven L. Webb, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 13 days.

(21) Appl. No.: 14/125,098

(22) PCT Filed: Jun. 10, 2011

(86) PCT No.: PCT/US2011/040056
§ 371 (c)(1),
(2), (4) Date: Dec. 10, 2013

(87) PCT Pub. No.: WO2012/170036
PCT Pub. Date: Dec. 13, 2012

(65) Prior Publication Data
US 2014/0118449 A1     May 1, 2014

(51) Int. Cl.
*B41J 2/21* (2006.01)
*B41J 11/00* (2006.01)
(Continued)

(52) U.S. Cl.
CPC ........... *B41J 11/0015* (2013.01); *B41J 2/2107* (2013.01); *B41J 2/2114* (2013.01); *B41M 5/0017* (2013.01); *C09D 11/322* (2013.01); *C09D 11/40* (2013.01); *C09D 11/54* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/95, 96, 100, 101, 102, 88, 99, 20, 347/21, 9; 106/31.6, 31.27, 13.13; 523/160, 523/161
See application file for complete search history.

(56) References Cited

U.S. PATENT DOCUMENTS 5,185,202 A * 2/1993 Serizawa ............... G03C 1/775
162/168.2
5,258,277 A * 11/1993 Ogata et al. .................. 430/538
(Continued)

FOREIGN PATENT DOCUMENTS

CN  1265625  9/2000
EP  2028016  3/2009
(Continued)

OTHER PUBLICATIONS

Extended European Search Report dated Feb. 4, 2014 for Application No. 11867307.8-1701/2718110 PCT/US2011040056, Applicant Hewlett-Packard Development Company, L.P., Reference No. 83702706.

*Primary Examiner* — Manish S Shah
(74) *Attorney, Agent, or Firm* — HP Inc. Patent Department

(57) ABSTRACT

A white pre-treatment composition and printing method using such pre-treatment composition are disclosed. Said white pre-treatment composition encompasses a liquid vehicle, a polyvalent metal salt, a latex resin and, at least, 8 wt % of a titanium dioxide particles dispersion. Also disclosed is an ink-set containing said white pre-treatment composition and, at least, an ink composition comprising a liquid vehicle and a colorant.

18 Claims, 1 Drawing Sheet

(51) Int. Cl.
*B41M 5/00* (2006.01)
*C09D 11/322* (2014.01)
*C09D 11/40* (2014.01)
*C09D 11/54* (2014.01)

(56) References Cited

U.S. PATENT DOCUMENTS

| | | | |
|---|---|---|---|
| 2006/0281889 A1* | 12/2006 | Kobayashi et al. | 528/34 |
| 2007/0060670 A1* | 3/2007 | Ellis | 347/100 |
| 2007/0197684 A1* | 8/2007 | Yamashita | C09D 11/54 523/160 |
| 2008/0090033 A1 | 4/2008 | Fu et al. | |
| 2008/0092309 A1* | 4/2008 | Ellis et al. | 8/478 |
| 2008/0241397 A1* | 10/2008 | Kato et al. | 106/31.13 |
| 2008/0268156 A1* | 10/2008 | Ueno et al. | 427/288 |
| 2009/0025587 A1* | 1/2009 | Verlinden et al. | 101/232 |
| 2009/0035478 A1* | 2/2009 | Zhou et al. | 428/32.21 |
| 2009/0202813 A1 | 8/2009 | Itami et al. | |
| 2009/0219330 A1 | 9/2009 | Kiyomoto et al. | |
| 2010/0075045 A1* | 3/2010 | Kaimoto et al. | 427/256 |
| 2010/0091052 A1* | 4/2010 | Ogawa et al. | 347/100 |
| 2010/0092673 A1 | 4/2010 | Kawakami et al. | |
| 2010/0190922 A1 | 7/2010 | Shinozaki et al. | |
| 2010/0231671 A1* | 9/2010 | Anton et al. | 347/101 |
| 2010/0323209 A1* | 12/2010 | Morgeneyer et al. | 428/452 |
| 2011/0122190 A1* | 5/2011 | Ono | 347/20 |

FOREIGN PATENT DOCUMENTS

| | | |
|---|---|---|
| EP | 2060404 | 5/2009 |
| JP | 11105202 | 4/1999 |

* cited by examiner

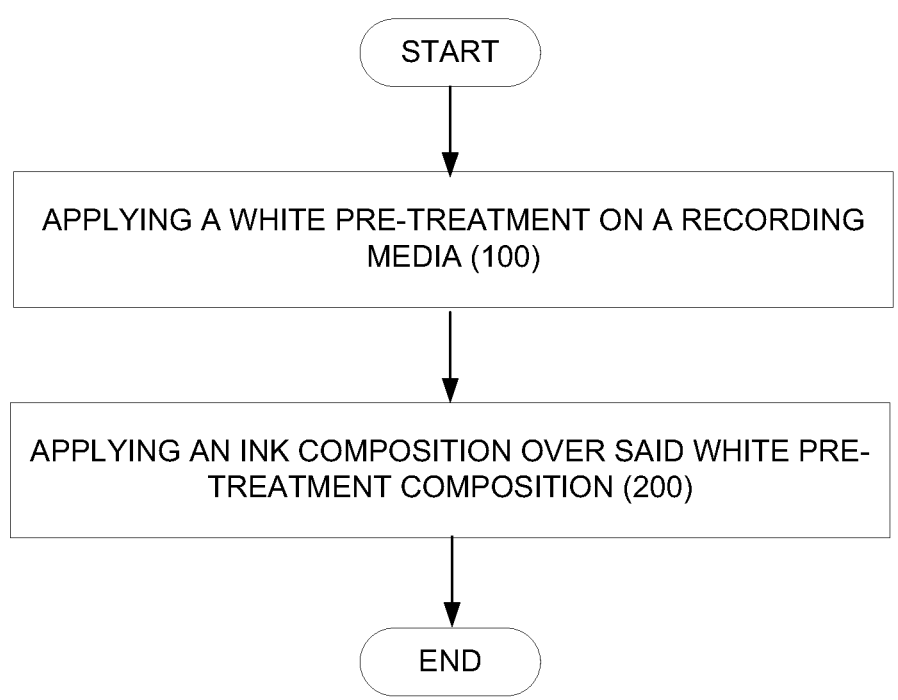

WHITE PRE-TREATMENT COMPOSITION

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a large diversity of media.

In inkjet printing method, both the media and the ink play an important role in the overall image quality and permanence of the printed images. In addition to ink composition, a pre-treatment composition can be applied before an ink composition is established on the print recording media. Such pre-treatment composition can significantly improve printing characteristics and attributes of the image.

As expanded colors and appearances are sought for home and office decorative printing, developments have been made to provide prints, as well as printed articles, that have specific features and that can be printed on diverse recording substrates, such as, for examples, packaging and labels. Within the use of such diverse recording media, pre-treatment formulations are often used in view of providing higher quality printed images. Specific colored ink, such as white inks, are valuable for providing good visibility when printing on said specific media. Indeed, said media can have surface that can be transparent and/or colored.

Accordingly, investigations continue into ink compositions and/or pre-treatment formulations that exhibit specific properties such as, for example, specific colors and that can help to print of diverse media surfaces.

BRIEF DESCRIPTION OF THE DRAWING

The drawing illustrates embodiments of the present method and is part of the specification.

FIG. 1 is flowcharts illustrating a method for printing image onto a recording media according to some embodiments of the present disclosure.

DETAILED DESCRIPTION

It is to be understood that the present disclosure is not limited to the particular process and materials disclosed herein. It is also to be understood that the terminology used herein is used for describing particular embodiments only and is not intended to be limiting. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

In some embodiments, the present disclosure refers to a white pre-treatment composition that includes a liquid vehicle, a polyvalent metal salt, a latex resin and, at least, 8 wt % of a titanium dioxide particles dispersion. Also referred herein is a method for printing images onto a recording media; such method includes applying a white pre-treatment composition onto a recording media and applying an ink composition, containing a liquid vehicle and a colorant, onto said recording media. Said white pre-treatment composition includes a liquid vehicle, a polyvalent metal salt, a latex resin, and at least 8 wt % of a titanium dioxide particles dispersion. The ink composition overprints said white pre-treatment composition. The recording media can be a packaging recording media or a label. In some other embodiments, the present disclosure refers to an ink-set containing a white pre-treatment composition and, at least, an ink composition containing a liquid vehicle and a colorant; said white pre-treatment composition encompasses a liquid vehicle, a polyvalent metal salt, a latex resin and, at least, 8 wt % of a titanium dioxide particles dispersion.

The pre-treatment composition and the ink-set, described herein, are able to provide white background and/or white images, as well as white opacity, on the recording media in which the pre-treatment is applied. The pre-treatment composition is, indeed, able to provide a white background when applied on dark recording media and/or on dark packaging or label stock. The ink composition that is applied, thereafter, on said white background, and can thus provide image with improved print quality and durability.

Furthermore, the white pre-treatment composition and the ink-set system including it are able to fix the ink colorant over the white pigment in the pre-treatment fluid, while controlling bleed and coalescence without driving off the carrier fluid between color planes. It can be considered that, after the pre-treatment composition is overprinted with ink composition on the substrate or, in other words, when ink and pre-treatment composition meet on the media surface, an effective immobilization of ink colorants is realized and nearly all the colorants of the ink composition are deposited on the surface of the media rather than penetrating the media and depositing below the surface. Thus, in addition to provide a white opaque recording media, the pre-treatment composition, upon contact with ink, might cause the colorants of the ink formulation to precipitate out and result in the enhancement of image quality attributes, as for example, optical density, chroma, and durability.

The combination of the use of white pre-treatment composition and ink composition results in printing methods that provide high quality and durable image prints on various kind of substrates, such as packaging media and labels. In addition, the white pre-treatment composition is a stable composition that does not present stability issues over time.

Pre-Treatment Composition

As used herein, the white pre-treatment composition is used as a fixing fluid composition in a printing method. The pre-treatment composition contains a liquid vehicle and an effective amount of one or more fixing agents. A fixing agent is an ingredient that initiates a change in the solubility or stability of the colorant and fixes the colorant in place in the printed image. In some examples, the white pre-treatment compositions have a viscosity that is more than about 2000 cps in order to achieve the desired rheological characteristics. In some other examples, the white pre-treatment compositions have a viscosity that is between about 3000 cps and about 10000 cps. The viscosity can be conveniently regulated, for instance, by suitable choice of the quantity and the molecular weight of binders resin, solvent, and other agents. Such viscosity is measured at 25° C., using a Brookfield Viscometer. The pre-treatment compositions can have a surface tension in the range of about 20 to about 40 dynes/cm.

In some embodiments, the white pre-treatment composition includes a liquid vehicle, a polyvalent metal salt, a latex resin and, at least, 8 wt % of a titanium dioxide particles dispersion. The white pre-treatment composition can be used in a variety of applications such as labeling and marking, visual arts, priming, undercoating, etc. One of the uses is to provide a good hiding power, that is, to be able to effectively mask the underlying color. The masking of the underlying color or image renders the underlying color less visually perceptible. The area can be left white or can be printed over with second color.

Titanium Dioxide Particles Dispersion

The white pre-treatment composition includes inorganic oxide nanoparticles; such inorganic oxide nanoparticles are titanium dioxide ($TiO_2$). Titanium dioxide particles may be in the rutile or anatase crystalline form and can be made by either a chloride process or a sulfate process. Both the sulfate and chloride processes are described in detail in "The Pigment Handbook", Vol. 1, 2nd Ed., John Wiley & Sons, NY (1988). A commercially available example of a titanium oxide is P-25 available from Degussa (Parsippany N.J.). In some examples, the titanium dioxide particles have a mean diameter that is between about 50 to about 500 nm. In some other examples, the titanium dioxide particles have a diameter that is between about 100 and about 300 nm, and, in yet some other examples, that is between about 200 and about 250 nm. The titanium dioxide particle dispersion can be present in an amount representing from about 2 to about 15 wt % or in an amount representing from about 6 to about 10 wt % of the total weight of the pre-treatment composition.

Titanium dioxide particles may be substantially pure titanium dioxide particles or may contain other metal oxides, such as silica, alumina and zirconia. Other metal oxides may become incorporated into pigment particles, for example, by co-oxidizing or co-precipitating titanium compounds with other metal compounds. If co-oxidized or co-precipitated metals are present, they can be present in an amount ranging from about 0.1 wt % to about 10 wt % or, in some other examples, in an amount ranging from about 0.5 wt % to about 5 wt % based on the total titanium dioxide pigment weight.

The titanium dioxide particles can be incorporated into an ink formulation via a slurry concentrate composition. The amount of titanium dioxide present in the slurry composition can be in the range of about 15 wt % to about 80 wt % based on the total slurry weight.

Titanium dioxide particles can be dispersed with dispersants. Examples of suitable dispersants include, but are not limited to, water-soluble species of low and high molecular weight such as phosphates and polyphosphates, carboxylates (such as oleic acid), polycarboxylates (such as acrylates and methacrylates). Other examples include hydrolysable alkoxysilanes with alkoxy group attached to water-soluble (hydrophilic) moieties such as water-soluble polyether oligomer chains. In some examples, the dispersant is a reactive silane coupling agents containing hydrophilic functional groups, such as amino, diamino, triamino, ureido, poly(ether), mercapto, glycidol functional groups and their hydrolysis product. Examples of silane coupling agents suitable as dispersants for metal oxides are (aminoethyl)aminopropyl-triethoxysilane, (aminoethyl)aminopropyl-trimethoxysilane, (aminoethyl)aminopropyl-methyl-dimethoxysilane, aminopropyl-triethoxysilane, aminopropyl-trimethoxysilane, glycidolpropyl-trimethoxysilane, ureidopropyl-trimethoxysilane and polyether-triethoxysilane, polyether trimethoxysilane hydrolysis product of aminopropyl-trimethoxysilane, and hydrolysis product of (aminoethyl) minopropyl-trimethoxysilane. In some embodiments, the dispersants used to disperse titanium dioxide particles are polyether alkoxysilane dispersants.

Examples of suitable polyether alkoxysilanes include $HO(CH_2CH_2O)_{n'}—Si(OCH_3)_3$; $HO—(CH_2CH_2O)_{n'}—Si(OCH_2CH_3)_3$; $CH_3O—(CH_2CH_2O)_{n'}—Si(OCH_3)_3$; $CH_3—O—(CH_2CH_2O)_{n'}—Si(OCH_2CH_3)_3$; $C_2H_5O—(CH_2CH_2O)_{n'}—Si(OCH_3)_3$; $C_2H_5O—(CH_2CH_2O)_{n'}—Si(OCH_2CH_3)_3$; $HO—(CH_2CH(CH_3)O)_{n'}—Si(OCH_3)_3$; $HO—(CH_2CH(CH_3)O)_{n'}—Si(OCH_2CH_3)_3$; $CH_3O—(CH_2CH(CH_3)O)_{n'}—Si(OCH_3)_3$; $CH_3O—(CH_2CH(CH_3)O)_{n'}—Si(OCH_2CH_3)_3$; $CH_3O—(CH_2CH_2O)_{n'}—Si(CH_3)(OCH_3)_2$; $CH_3O—(CH_2CH_2O)_{n'}—Si(CH_3)_2(OCH_3)$; $CH_3—O—(CH_2CH_2O)_{n'}—Si(CH_3)(OC_2H_5)_2$; $CH_3—O—(CH_2CH_2O)_{n'}—Si(CH_3)_2(OC_2H_5)$ wherein n' is an integer equal to 2 or greater. In some examples, n' is an integer ranging from 2 to 30 and, in some other examples, n' is an integer ranging from 5 to 15.

Commercial examples of polyether alkoxysilane dispersants include, but are not limited to, Silquest® A-1230 manufactured by Momentive Performance Materials, and Dynasylan® 4144 manufactured by Evonik/Degussa.

The amount of dispersants used in the titanium dioxide particles dispersion may vary from about 1 wt % to about 300 wt % of the dispersed titanium dioxide particles content. In some examples, the dispersant content is ranging between about 2 and about 150 wt % or is ranging between about 5 and about 100 wt % of the dispersed titanium dioxide particles content.

Polyvalent Metal Salt

The white pre-treatment compositions include, as a fixing agent, a polyvalent metal salt. The polyvalent metal salt component can be a divalent or a higher polyvalent metallic ion and anion. The polyvalent metal salt component is soluble in water. The polyvalent metal salt can be present in an amount representing from about 2 to about 16 wt % or in an amount representing from about 6 to about 12 wt % of the total weight of the white pre-treatment composition.

Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In some examples, the polyvalent metallic ion is selected from the group consisting of $Ca^{2+}$, $Mg^{2+}$ and $Zn^{2+}$. In some other examples, the polyvalent metallic ion is $Ca^{2+}$. Examples of anions include $Cl^-$, $I^-$, $Br^-$, $NO_3^-$ or $RCOO^-$ (where R is H or any hydrocarbon chain). The polyvalent metal salt anion can be a chloride ($Cl^-$) or acetate ($CH_3COO^-$). It can be composed of divalent or polyvalent metallic ions and of nitrate or carboxylate ions. The carboxylate ions are derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid. The polyvalent metal salt can be selected from the group consisting of calcium chloride, calcium nitrate, magnesium nitrate, magnesium acetate and zinc acetate. In some examples, the polyvalent metal salt is calcium chloride or calcium nitrate ($CaCl_2$ or $Ca(NO_3)_2$). In some other examples, the polyvalent metal salt is calcium chloride ($CaCl_2$).

Latex Resin

In some embodiments, the white pre-treatment composition includes a latex resin. The latex resin can be cationic, anionic or amphoteric polymeric latex. The latex resin is present, in the composition, in the form of stable dispersions of polymeric micro-particles dispersed in an aqueous matrix. The latex resin can be present in an amount representing from about 5 to about 70 wt % or in an amount representing from about 10 to about 50 wt % of the total weight of the white pre-treatment composition.

In some examples, the latex resin has an acid number of less than 20. In some other examples, the latex resin has an acid number of less than 18. As used herein, the acid number (AN) refers to the number of acid that has been measured by conductivity titration of the latent acid functions of latex resin with nitric acid. (The sample can be made strongly basic with KOH then it is titrated with 1% of $HNO_3$). The pH and conductivity curves are measured simultaneously. Latex resin can be a resin made of polymers and copolymers selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, and acrylonitrile-butadiene polymers or copolymers. In some examples, the latex resin is a latex component containing particles of vinyl acetate-based polymer, acrylic polymer, styrene polymer, SBR-based polymer, polyester-based polymer, vinyl chloride-based polymer, or the like. In some other examples, the latex resin is a polymer or a copolymer selected from the group consisting of acrylic polymers, vinyl-acrylic copolymers and acrylic-polyurethane copolymers. The latex resin may have an average molecular weight (Mw) of 5,000 to 500,000 or an average molecular weight (Mw) ranging from 150,000 to 300,000. In some examples, the latex resins have an average molecular weight of about 250,000.

In some examples, the average particle diameter of the latex resin particles is from about 10 nm to about 1 μm; in some other examples, from about 10 to about 500 nm, and, in yet some other examples, from about 50 nm to about 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

The glass transition temperature (Tg) of the resin latex can be in the range of about −30° C. to about 70° C. or can be in the range of about 0° C. to about 40° C. In some examples, the glass transition temperature of the resin latex is below about 30° C. The way of measuring the glass transition temperature (Tg) parameter is described in, for example, Polymer Handbook, 3rd Edition, authored by J. Brandrup, edited by E. H. Immergut, Wiley-Interscience, 1989.

The latex resin of the present disclosure can have an acid number of less than 20 and a glass transition temperature that is below about 40° C. In some examples, the pre-treatment composition includes an anionic latex resin with an acid number below 20, with a glass transition temperature that is below about 40° C. and with a molecular weight of approximately 250,000.

The latex resin may include, but is in no way limited to latex resin sold under the name Hycar® or Vycar® (from Lubrizol Advanced Materials Inc.); Rhoplex® (from Rohm & Hass company); Neocar® (from Dow Chemical Comp); Aquacer® (from BYC Inc) or Lucidene® (from Rohm & Hass company).

Liquid Vehicle and Additives

The white pre-treatment composition, such as defined herein, includes a liquid vehicle. The term "liquid vehicle" is defined to include any liquid composition that is used to carry the ingredients of the pre-treatment composition to the media surface. Such liquid vehicle may include a mixture of a variety of different agents, including without limitation, surfactants, solvent and co-solvents, buffers, biocides, viscosity modifiers and water. Organic solvents can be part of the liquid vehicle. The solvent can be used in an amount representing from about 0.1 to about 30 weight percentage of the ink composition. In some examples, the liquid vehicle is an aqueous liquid vehicle. The water can make up the balance of the ink composition, and may be present in an amount representing from about 40 to about 95 weight percentage of the pre-treatment composition. In addition to water, various types of agents may be employed to optimize the properties of the composition for specific applications.

The white pre-treatment composition might contain surfactants. Surfactants can be nonionic surfactants selected from the group consisting of nonionic fluorosurfactant, nonionic acetylenic diol surfactant, nonionic ethoxylated alcohol surfactant and combinations thereof. In some examples, the pre-treatment composition contains nonionic ethoxylated alcohol surfactant. Several commercially available nonionic surfactants may be used, examples of which include ethoxylated alcohols such as those from the Tergitol® series (e.g., Tergitol® 15S30, Tergitol® 15S9) manufactured by Dow Chemical; surfactants from the Surfynol® series (e.g. Surfynol® 440 and Surfynol® 465) manufactured by Air Products and Chemicals; fluorinated surfactants such as those from the Zonyl® family (e.g., Zonyl® FSO and Zonyl® FSN surfactants) manufactured by E.I. DuPont de Nemours and Company; fluorinated PolyFox® nonionic surfactants (e.g., PF159 nonionic surfactants) manufactured by Omnova; or combinations thereof. Surfactants can be present in the pre-treatment composition in an amount ranging from about 0.1 wt % to about 1.5 wt %.

The white pre-treatment composition may include a thickener. As thickener, it is meant herein any component that is able to modify the viscosity of the composition, i.e. a viscosity modifier. Non-limiting examples of thickeners include polyvinyl alcohol, polyacrylamide, polyacrylic acids and alkali soluble emulsion (such as acrylic and styrene maleic emulsion). Examples of thickener include also alkali-swellable acrylic thickeners, such as Acrysol® Ase-60 (available from Rohm & Haas), Acrysol® Ase-75, Rheolate® 450 and Rheolate® 420, and associative thickeners, such as Elementis Rheolate®255 (available from Rheox International Inc). The thickener can be present in an amount ranging from about 0.01% to about 2% by weight based on the total weight of the pre-treatment composition.

The white pre-treatment composition may include a defoamer (or defoaming agent). Such defaming agent can be nonionic surfactants such as acetylene glycol-based surfactants and/or polyether denatured siloxane surfactants. Further examples of polyether denatured siloxane-based surfactants include BYK-345®, BYK-346®, BYK-347®, BYK-348®, and UV3530® of Byk Co. Other non-limiting examples of defoamer include Surfynol® DF-659, Surfynol® DF-58, Surfynol® DF-66 (all from Air Products), Foammaster® (from Henkel) BYK®-019, BYK®-021, BYK®-022, BYK®-025 (all from Byk Co.). The defoamer can be present in an amount ranging from about 0.01% to about 2% by weight based on the total weight of the pre-treatment composition.

One or more additives may also be incorporated into any of the embodiments of the pre-treatment composition. As used herein, the term "additive" refers to a constituent of the fluid that operates to enhance performances, environmental effects, aesthetic effects, or other similar properties of the composition. Examples of suitable additives include biocides, sequestering agents, chelating agents, anti-corrosion agents, marker dyes (e.g., visible, ultraviolet, infrared, fluorescent, etc.), dyes, optical whiteners, brighteners and/or combinations thereof.

Printing Method

In some embodiment, the present disclosure refers to a method for printing images onto a recording media. Such method includes applying a white pre-treatment composition, containing a liquid vehicle, a polyvalent metal salt, a latex resin and, at least, 8 wt % of a titanium dioxide particles dispersion onto a recording media and applying an ink composition onto said recording media. Said ink composition includes a liquid vehicle and a colorant. In some example, the ink overprints the pre-treatment composition. The image forming method includes thus depositing a white pre-treatment composition on a recording media, then jetting an ink composition that will react with said pre-treatment composition.

FIG. 1 is a flowcharts illustrating a method for printing images onto a recording media, according to some embodiments of the present disclosure, wherein a white pre-treatment composition is applied onto a recording media (100) and wherein an ink composition is further applied, onto said recording media, over said white pre-treatment composition (200).

In some examples, the method for printing images is an inkjet printing method. By inkjet printing method, it is meant herein a method wherein a stream of ink droplets is jetted onto a recording media to form the desired printed image. The ink composition may be established on the recording media via any suitable inkjet printing technique. Non-limitative examples of such techniques include thermal, acoustic, and piezoelectric inkjet printing. In some examples, the ink composition is jetted onto the recording media using an inkjet nozzle and/or thermal inkjet printhead. The method for printing inkjet ink images can be a high-speed printing method. By high speed, it is meant herein a method capable of printing more than 50 feet per minute. As an example, the web speed could be from about 50 to about 2000 feet per minute. The printing method is well suited for high speeds industrial and for commercial printing. The printing method is also well adapted for in-line and high-through put printing applications. In some example, the method for printing images onto a recording media includes applying the white pre-treatment composition, such as defined above, onto a recording media using coater or coating devices and jetting an ink composition, onto said recording media, via inkjet nozzles, said ink composition including a liquid vehicle and a colorant.

The coater is not particularly limited and can be appropriately selected from known coaters according to the intended use. Examples of coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki. In some example, the coater is a transfer roll coating device. In order to apply the pre-treatment composition to the recording media with a uniform thickness, an air-knife may be used for the coating or a member having an acute angle may be positioned with a gap corresponding to the predetermined amount of pre-treatment composition, between the member and the recording media. The application of the pre-treatment composition may also be done by gravure, inkjet method, spray coating method, and roller coating method. In some example, the pre-treatment composition is applied by a coating method using rollers. Thus, the pre-treatment composition can be rolled on recording media using commercial roll coating equipment. The printing method can include, thus, applying the white pre-treatment composition onto the recording media with rollers or transfer roll coating devices.

In some examples, the white pre-treatment composition is applied to a recording media using coating devices and, subsequently, the ink is jetted by inkjet nozzles to record an image. Said inkjet ink composition includes a liquid vehicle and a colorant, wherein the inkjet ink overprint said pre-treatment composition. The time interval between the finishing point of the application of the pre-treatment composition on the recording media and between the starting point of the application of the ink composition can be between 0.0001 seconds and 80 seconds. In some examples, the time interval is between 0.0001 second and 10 second. In some other examples, the time interval is below 5 seconds. The ink composition can be jetted onto a recording media just after the application of the pre-treatment composition, while the pre-treatment composition is still wet on the recording media, ensuring a proper mixture between the ink composition and the white pre-treatment composition.

Recording Media

The recording media, or recording substrate, can be any material that will be able to provide a mechanical support to the white pre-treatment composition and that could be printed on. The recording media or substrate includes porous and non-porous surfaces, may take the form of a sheet, a web, or a three-dimensional object of various shapes and can have any size. In some examples, the recording media can be a flexible film or a rigid substrate. It may be selected from cellulosic or synthetic paper (coated or uncoated), cardboard, polymeric film (e.g. plastic sheet like PET, polycarbonate, polyethylene, polypropylene), fabric, cloth and other textiles. The recording media may be single material plastic film made from PET, polyimide or other suitable polymer film with adequate mechanical properties. The recording media can also be a metal foils, a rigid and/or flexible glass. The recording media can be, but is in no way limiting to, resin coated papers (so-called photobase papers), papers, overhead projector plastics, coated papers, fabrics, art papers (e.g. water color paper), plastic film of any kind, plastic carrier bags, cardboard boxes, packaging, textile and the like.

In some examples, the recording media is a packaging recording substrate, a label or a label stock. As "packaging recording substrate", it is meant herein non-absorptive plastics and films thereof employed for so-called soft packaging, in addition to common non-coated paper and coated paper.

The packaging recording substrate can be packaging glassware (beverage bottles, cosmetic containers) or commercial glassware. A "label" is defined herein as a piece of paper, polymer, cloth, metal, or other material affixed to a container or article. As "label stock", it is meant herein a media substrate that can be coated on one side with adhesive and that can be printed on the other side. Label stocks can be a wide variety of papers, films, fabric, foils, etc. In some other examples, the recording media is a dark packaging recording media or dark label stock media.

Ink-Set

In some embodiments, the present disclosure relates to an ink-set that encompasses a white pre-treatment composition and, at least, an ink composition containing a liquid vehicle and a colorant. Said pre-treatment composition contains a liquid vehicle, a polyvalent metal salt, a latex resin and, at least 8% of a titanium dioxide particles dispersion. The term "ink-set" refers herein to all the individual inks or other fluids a printer is equipped to jet. In some examples, the ink-set contains the white pre-treatment composition as described above and one, or more, other inks. In some other examples, such other inks are non-white inks and contain other colorants that are dispersed in the ink vehicle. It is to be understood that any number of colored ink compositions may be used in such ink-set. Any desirable combination of colored inks may be used. For example, each of the ink compositions may be of a different color, or two or more of the inks may be of different shades of the same color (i.e., light magenta and dark magenta inks). In some examples, four different colored inks can be used: a black ink, a yellow ink, a cyan ink, and a magenta ink. In some other examples, the ink-set includes any desirable number of inks selected from black ink, yellow ink, cyan ink, magenta ink, orange ink, red ink, green ink, and/or combinations thereof. At least one ink can be deposited into individual printheads. Non-limiting examples of suitable printhead configurations including single printheads, dual chamber printheads, tri-chamber printheads and/or the like, and/or combinations thereof can be used.

Ink Composition

In some embodiments, the ink composition contains a liquid vehicle and a colorant. The ink composition includes one or more colorants that impart the desired color to the printed message. The ink composition can also includes other ingredients such as surfactants, dispersants, binders, and/or other additives and adjuvants. In some examples, the ink composition is an inkjet ink composition. As used herein, "colorant" includes dyes, pigments, and/or other particulates that may be suspended or dissolved in an ink vehicle. In some examples, the ink contains pigments as colorants. "Pigment" refers to a colorant particle that is substantially insoluble in the liquid vehicle in which it is used. Pigments can be dispersed using a separate dispersing agent, or can be self-dispersed, having a dispersing agent attached to the surface of the pigment. The "ink vehicle" is defined to include any liquid composition that is used to carry colorants, including pigments, to a substrate. A wide variety of liquid vehicle components may be used and include, as examples, water or any other kind of solvents. In some examples, the liquid vehicle is an aqueous liquid vehicle. Such liquid vehicles may further include a mixture of different agents, including without limitation, surfactants, solvents and co-solvents, buffers, biocides, viscosity modifiers, sequestering agents, stabilizing agents and water. Though not liquid per se, the liquid vehicle can also carry other solids, such as polymers, UV curable materials, plasticizers, salts, etc. In some examples, the colorant is selected from a yellow colorant, a magenta colorant, a cyan colorant and a black colorant, and the ink vehicle includes at least one solvent present in an amount ranging from about 1 to about 25 wt %; at least one surfactant present in an amount ranging from about 0.1 to about 8 wt %; at least one polymer present in an amount ranging from about 0 to about 6 wt %; at least one additive present in an amount up to about 0.2 wt %; and water.

Ingredients and abbreviations

Lucidene® 645 is an acrylic-urethane polymer available from Rohm & Haas Company.

Acrysol RM-8W® is a thickener available from Dow Chemical Comp.

Proxel® GXL is a biocide available from Arch Chemicals Inc.

Chemguard S-550® is a fluorosurfactant available from Chemguard.

Byk-018® is a defoamer available from Byk Co.

LEG-1 is a co-solvent available from Liponics.

Zonyl® FSO is a surfactant available from Dupont Inc.

Cab-O-Jet® 300 is a self dispersed pigment available from Cabot Corporation

Joncryl® 586 is a styrene-acrylic binder available from BASF Corp.

Ti-Pure® R900 and R931 are $TiO_2$ dispersion available from DuPont.

Momentive Silquest® A-1230 is a dispersant available from Momentive Performance Materials.

Example 1

Ink Composition

A black inkjet ink composition is prepared in accordance with TABLE 1 below. All percentages are expressed in percentage by weight (wt %) based on the total weight of the ink composition.

TABLE 1

| Component | Amount (wt %) |
| --- | --- |
| BP 700 Black Pigment | 3.0 |
| Cab-O-Jet ® 300 | 1.0 |
| Joncryl ® 586 | 1.0 |
| 2-Pyrrolidone | 10.0 |
| LEG-1 | 1.0 |
| Zonyl ® FSO | 0.1 |
| Proxel ® GXL | 0.1 |
| Water | Balance |

Example 2

Pre-Treatment Composition

Pre-treatment compositions 1, 2 and 3 are prepared in accordance with TABLE 2 below. All percentages are expressed by weight percentage (wt %) based on the total weight of the pre-treatment composition. Viscosity (in Cps) is evaluated, at 25° C., using a Brookfield Viscometer. Surface tension (in dynes/cm) is evaluated using a DuNouy Tensiometer. The $TiO_2$ dispersion is based on the use of Ti-Pure® dispersions R900 and R931 (R900 is $SiO_2/Al_2O_3$-coated $TiO_2$, coating is about 10 wt %; R931 is pure $TiO_2$). Both materials were milled with reactive PEG-alkoxysilane dispersant (Momentive Silquest®A-1230) down to mean particle size of about 200 to about 250 nm.

TABLE 2

| Ingredients | Pre-treatment Composition 1 | Pre-treatment Composition 2 | Pre-treatment Composition 3 |
|---|---|---|---|
| Lucidene 645 ® | 22.5 | 22.5 | 22.5 |
| Calcium Chloride | 5.5 | 5.5 | 5.5 |
| $TiO_2$ dispersion | 6.0 | 8.0 | 8.0 |
| Chemguard S550 surfactant ® | 0.1 | 0.1 | 0.1 |
| Byk-018 ® | 0.1 | 0.1 | 0.1 |
| Acrysol RM-8W ® | 0.3 | 0.3 | 0.3 |
| Proxel GXL ® | 0.1 | 0.1 | 0.1 |
| water | Up to 100% | Up to 100% | Up to 100% |
| Viscosity (cps) | 20 | 2000 | 3000 |
| Surface tension (dynes/cm) | 23.65 | 24.43 | 24.47 |

White pre-treatment compositions 1, 2 and 3 are applied onto blue porous media (blue greeting card paper, 0.20 mm thick). White pre-treatment compositions are applied by hand draw down on said media. The coating generated by applications of said pre-treatment compositions ranges from about 10 to about 30 gsm. Visual assessments of the whiteness and of the opacity, against the dark media background, are made. The results are illustrated in Table 3.

TABLE 3

| Visual assessments | Pre-treatment Composition 1 | Pre-treatment Composition 2 | Pre-treatment Composition 3 |
|---|---|---|---|
| White background | Very poor | good | Excellent |
| Opacity | Very poor | fair | Excellent |

Pre-treatment composition 3 is rolled, with an industrial coating fixture, on media using a forward roll coating. Said media is a brown packaging paper having a thickness of about 0.28 mm (brown Kraft). (This brown paper is similar to absorbent media used for packaging/boxes, which are identified by inking or stick on labels). An image sequence is then printed with black ink having formulation such as illustrated in Example 1, using a HP T-200 web-press. The coating weight, for the white pre-treatment composition 3, ranges from about 6 to about 10 grams/sq meters (gsm). A black image, having about 10 grams/sq meter (gsm) of black ink, is then printed on top of the white pre-treatment composition. The web speed for the printing process is of about 100 fpm; the print delay time is about 1 seconds. The resulting image media appears on a white substrate without any bleeding effects. The whiteness of the media is visually assessed. The bleed control of the calcium salt is also visually evident. The black optical density (KOD) is measured using an X-Rite densitometer. The higher the KOD value, the darker the black colored image obtained. The printed image has a black ink optical density of about 1.33 GMS.

Example 3

Stability of Pre-Treatment Compositions

Pre-treatment composition 3, as illustrated in Table 2 of example 2, is tested for its stability after one week at 60° C. Pre-treatment composition 3 remains stable and opaque. On the other hand, a comparative composition, containing about 8 wt % of a $TiO_2$ dispersion and about 5 wt % of calcium salts, presents an immediate flocculation of the pigments. (Said comparative composition is on the form of a gel).

The preceding description has been presented only to illustrate and describe exemplary embodiments of the present disclosure. Although certain example methods and compositions have been described herein, the scope of coverage of this case is not limited thereto. On the contrary, this patent covers all methods, compositions and articles of manufacture fairly falling within the scope of the claims either literally or under the doctrine of equivalents.

The invention claimed is:

1. A white pre-treatment composition comprising a liquid vehicle, a polyvalent metal salt, a latex resin in the form of a dispersion of polymeric particles dispersed in an aqueous matrix and, at least, 8 wt % of a titanium dioxide particles dispersion.

2. The white pre-treatment composition according to claim 1 wherein said composition has a viscosity that is more than about 2000 cps.

3. The white pre-treatment composition according to claim 1 wherein said composition has a viscosity that is between about 3000 cps and about 10000 cps.

4. The white pre-treatment composition according to claim 1 wherein the titanium dioxide particles dispersion comprises polyether alkoxysilane dispersants.

5. The white pre-treatment composition according to claim 1 wherein the titanium dioxide particles have a mean diameter that is between about 50 to about 500 nm.

6. The white pre-treatment composition according to claim 1 wherein the titanium dioxide particles dispersion is present in an amount representing at least 8 wt % up to about 15 wt % of the total weight of the pre-treatment composition.

7. The white pre-treatment composition according to claim 1 wherein the polyvalent metal salt is selected from the group consisting of calcium chloride, calcium nitrate, magnesium nitrate, magnesium acetate and zinc acetate.

8. The white pre-treatment composition according to claim 1 wherein the polyvalent metal salt is calcium chloride or calcium nitrate.

9. The white pre-treatment composition according to claim 1 wherein the latex resin has an acid number of less than 20.

10. The white pre-treatment composition according to claim 1 wherein the latex resin is a polymer or a copolymer selected from the group consisting of acrylic polymers, vinyl-acrylic copolymers and acrylic-polyurethane copolymers.

11. The white pre-treatment composition according to claim 1, wherein the white pre-treatment composition comprises at least about 40 wt % water.

12. An ink-set comprising:
  a. a white pre-treatment composition containing a liquid vehicle, a polyvalent metal salt, a latex resin in the form of a dispersion of polymeric particles dispersed in an aqueous matrix and, at least, 8 wt % of a titanium dioxide particles dispersion;
  b. and, at least, an ink composition comprising a liquid vehicle and a colorant.

13. The ink-set according to claim 12 wherein the titanium dioxide particles dispersion, in the white pre-treatment composition, comprises polyether alkoxysilane dispersants.

14. The ink-set according to claim 12, wherein the white pre-treatment composition comprises at least about 40 wt % water.

15. A method for printing images onto a recording media, comprising:
  a. applying a white pre-treatment composition onto a recording media, said pre-treatment composition comprising a liquid vehicle, a polyvalent metal salt, a latex resin in the form of a dispersion of polymeric particles dispersed in an aqueous matrix and, at least, 8 wt % of a titanium dioxide particles dispersion;

b. applying an ink composition, comprising a liquid vehicle and a colorant, over said white pre-treatment composition.

16. The method for printing images according to claim 15 wherein the white pre-treatment composition is applied onto the recording media using coating devices and wherein the ink composition is jetted onto said recording media via inkjet nozzles.

17. The method for printing images according to claim 15 wherein the recording media is a packaging recording substrate, a label or a label stock.

18. The method for printing images according to claim 15, wherein the white pre-treatment composition comprises at least about 40 wt % water.

\* \* \* \* \*